Jan. 11, 1966  L. SCHAFER  3,228,356
UNIQUE DIE FOR EXTRUSION OF PASTRY
Filed Aug. 21, 1963

United States Patent Office 3,228,356
Patented Jan. 11, 1966

3,228,356
UNIQUE DIE FOR EXTRUSION OF PASTRY
Leonhard Schafer, 219 Miriam St., Bronx, N.Y.
Filed Aug. 21, 1963, Ser. No. 303,489
3 Claims. (Cl. 107—1)

This invention relates to a die used in the manufacture of cookies and more particularly to a die adapted to extrude the words Happy Birthday embedded in a cookie composition.

It is practically impossible to prepare cookies by hand having inlaid lettering therein.

It is an object of this invention to provide a die capable of extruding lettering.

It is another object to provide a die capable of extruding a lettering stream of pastry dough in bonded relationship within another stream of pastry dough.

Figure 1:
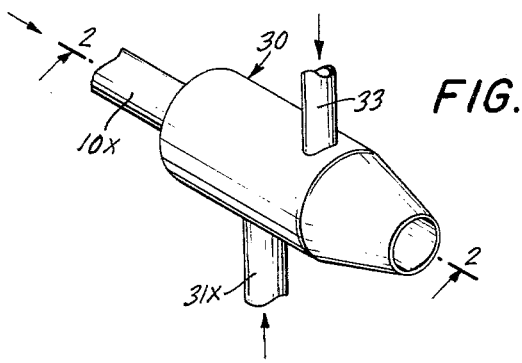
Figure 2:
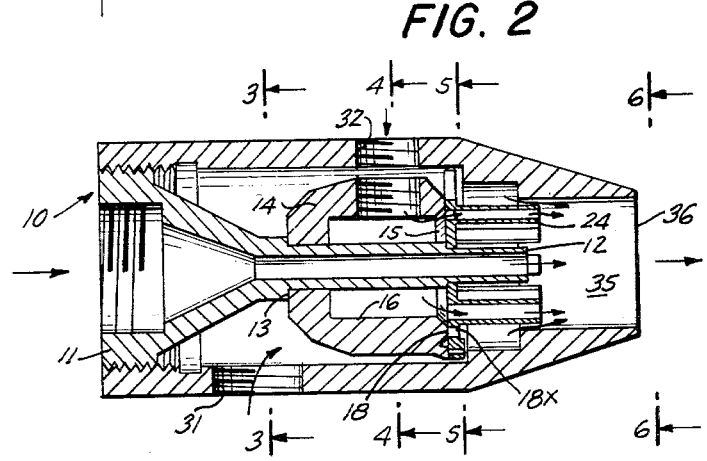
Figure 3:
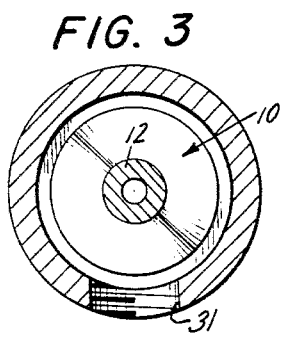
Figure 4:
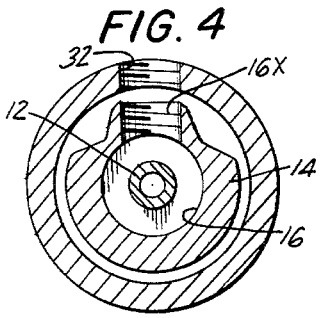
Figure 5:
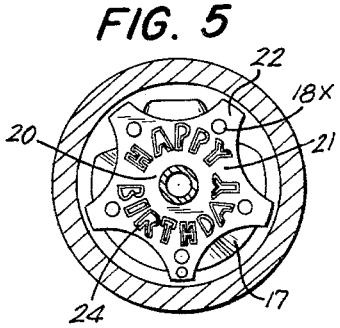
Figure 6:
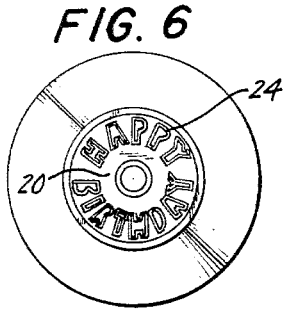
Figure 7:

These and other objects of this invention will become apparent upon reading the following descriptive disclosure of an illustrative embodiment taken in conjunction with the accompanying drawing in which:

FIG. 1 is a perspective view of the die showing by means of arrows the feed streams of pastry dough into the die, FIG. 2 is a longitudinal section view taken on line 2—2 of FIG. 1 and showing by means of arrows the various pastry streams of the die, FIG. 3 is a transverse section taken on line 3—3 of FIG. 2, FIG. 4 is a transverse section taken on line 4—4 of FIG. 2, FIG. 5 is a transverse section taken on line 5—5 of FIG. 2, FIG. 6 is a front view taken on line 6—6 of FIG. 2 and FIG. 7 is a perspective view of a three color cookie made from three streams of extruded pastry dough commingled within the die to a composite extrusion rod.

According to this invention, three separate pastry dough streams are commingled in bonded relationship to form a composite extrusion issuing from the die.

Turning to the drawing, an integral tubular inner cone element 10 is provided with a threaded base 11 and a cylindrical tube 12. The tube 12 is provided with a shoulder 13.

A tubular bulbous element 14 is disposed upon tube 12 engaging the shoulder 13 at one end. The other end of the bulbous element 14 is provided with a wide mouth 15 leading into a large cavity 16. A threaded aperture 16X communicates between the cavity and the outside of bulbous element 14.

The rim of mouth 15 is flat and the bulbous element is provided around the mouth rim outside edge (FIG. 5) with curved surface 17. A plurality of pillars 18 having integral pins 18X therein are provided in the curved surface 17.

A lettering element 20 is provided with a flat centrally apertured base 21 having several apertured integral arms 22, which are disposed on said pillars 18. A single pin 18X in one of the plurality of pillars 18 engaging an aperture of a single arm will prevent rotation of the lettering element 20 around the tube 12.

The flat base 21 is provided with suitable lettering holes such as Happy Birthday and corresponding relatively long letter tubes 24 are welded or otherwise secured thereto. Thus pastry forced through said letter tubes moves in a plurality of spaced streams of various cross sections constituting the desired lettering and parallel to pastry issuing from tube 12.

A tubular jacket element 30 of rigid construction is provided with interior threads to engage the threaded base 11 of cone element 10. The jacket 30 is also provided with a threaded aperture 31 and conduit 31X for introducing a pastry stream about the lettering and is disposed in a suitable spaced relationship to the bulbous element 14 and is also provided with a threaded aperture 32 for alinement with threaded aperture 16X of the bulbous element 14 to receive a common conduit 33 through both aperture 32 and 16X thereby introducing a stream of pastry dough into cavity 16 and thence out of the various letters which engage said cavity 16. Conduit 33 is threaded through both the threaded aperture 32 and the threaded aperture 16X when these two are in alinement in order to feed a specific pastry directly into the cavity 16 of the bulbous element 14 and then into the tubular letters.

Conduit 31X is connected to the jacket element 30 and feeds a specific pastry around the outside surface of the bulbous element 14 and over the front curved surface 17 of said bulbous element in the spaces between the tubular letters.

As shown in FIGS. 5 and 6 the letters of the lettering are spaced apart to permit flow of pastry from conduit 31X therebetween.

As shown in FIG. 2, the jacket 30 is provided at its mouth end with a cylindrical horizontally disposed portion 35. The ends of the lettering terminate preferably between one-third to one-half the distance within the jacket portion 35. Such an arrangement permits the parallel horizontal (FIG. 2) flow of the three streams of pastry to combine in area 35 and be compressed therein in bonded relationship before emerging out of orifice 36 of the jacket.

In short, in the operation of the die of this invention a first stream of suitable pastry dough, for example, chocolate colored dough, 50 (FIG. 7) is forced through conduit 10X into element 10 and out of the tube 12 in suitable spaced relationship to the ends of the letter tubes 24 (FIG. 2).

A second stream of for example, pink colored dough is introduced by way of the long threaded conduit 33 into the cavity 16 of the bulbous element 14 and thence out of the tubular letters ahead of the chocolate stream (FIG. 2).

A third stream of white pastry dough is forced through conduit 31X around cone element 10 and around bulbous element 14 and over the curved surface 17 thereof into the spaces between the lettering and also on both sides of the lettering to give a continuously extruded product having the transverse configuration shown in FIG. 7.

Manifestly if lettering other than Happy Birthday is desired in the extruded product another suitably lettered lettering element may be substituted therefor.

I claim:

1. A die for the simultaneous bonded extrusion of multiple streams of pastry dough comprising a conical tubular element having a pipe portion; a bulbous tubular element having a wide mouth leading to a cavity at one end and an aperture disposed in the other end disposed upon said pipe portion of said conical element, said bulbous element having a threaded aperture in its side for introducing pastry therein; a tubular lettering element having a centrally apertured flat base and tubular letters secured thereabout disposed around said pipe portion and upon said wide mouth of the bulbous element, and a tubular jacket element disposed in suitably spaced relationship around said pipe portion, said bulbous element and said lettering element and secured at its base to said conical element, said jacket element having a pair of suitably located apertures for introducing a pair of pastry streams, said jacket element having a cylindrical end tubular portion at its orifice.

2. The die of claim 1 wherein pastry dough conduit means is provided connecting an aperture of said jacket element to said side aperture of said bulbous element whereby one of said pastry dough streams is introduced into the cavity of said bulbous element.

3. The die of claim 1 wherein the orifice of the pipe portion of the conical element is suitably spaced within the tubular letters and away from the orifices thereof and wherein the orifices of the tubular letters are suitably located within the end cylindrical tubular portion of the jacket element, whereby the multiple streams of pastry dough are successively bonded to one another within the successive confining restraints between said tubular letters and within the end portion of said jacket element.

References Cited by the Examiner

UNITED STATES PATENTS

| | | | |
|---|---|---|---|
| 1,981,928 | 11/1934 | Sheppard et al. | 107—1 |
| 2,199,825 | 5/1940 | Kretchmer | 107—1 X |
| 2,296,842 | 9/1942 | Garvey et al. | 25—8 X |

WALTER A. SCHEEL, *Primary Examiner.*

JOSEPH SHEA, *Assistant Examiner.*